United States Patent
Dwivedi et al.

(10) Patent No.: US 9,741,142 B2
(45) Date of Patent: Aug. 22, 2017

(54) METHOD AND APPARATUS FOR ENABLING TEXT EDITING IN A SCANNED DOCUMENT WHILE MAINTAINING FIDELITY OF THE APPEARANCE OF THE TEXT

(71) Applicant: Adobe Systems Incorporated, San Jose, CA (US)

(72) Inventors: Uttam Dwivedi, Kanpur (IN); Atul Kumar Puri, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 262 days.

(21) Appl. No.: 14/281,163

(22) Filed: May 19, 2014

(65) Prior Publication Data
US 2015/0332491 A1    Nov. 19, 2015

(51) Int. Cl.
| | |
|---|---|
| *G09G 5/00* | (2006.01) |
| *G06T 11/60* | (2006.01) |
| *G06K 9/62* | (2006.01) |
| *G06F 17/24* | (2006.01) |
| *H04N 1/00* | (2006.01) |
| *G06F 17/21* | (2006.01) |
| *G06K 9/68* | (2006.01) |

(52) U.S. Cl.
CPC ............ *G06T 11/60* (2013.01); *G06F 17/214* (2013.01); *G06F 17/24* (2013.01); *G06K 9/6202* (2013.01); *G06K 9/6215* (2013.01); *G06K 9/6828* (2013.01); *H04N 1/00* (2013.01); *G06K 2209/01* (2013.01)

(58) Field of Classification Search
USPC ......................................................... 345/636
See application file for complete search history.

(56) References Cited

U.S. PATENT DOCUMENTS

| | | | | |
|---|---|---|---|---|
| 5,167,016 | A * | 11/1992 | Bagley | G06T 11/60 715/210 |
| 5,548,700 | A * | 8/1996 | Bagley | G06T 11/60 715/255 |
| 6,426,751 | B1 * | 7/2002 | Patel | G06F 17/214 345/468 |
| 2004/0220898 | A1 * | 11/2004 | Eguchi | G06F 17/30259 |
| 2007/0189628 | A1 * | 8/2007 | Nolan | G06K 9/72 382/254 |

* cited by examiner

*Primary Examiner* — Frank Chen
(74) *Attorney, Agent, or Firm* — Keller Jolley Preece

(57) ABSTRACT

A computer implemented method and apparatus for enabling text editing in a scanned document while maintaining fidelity of appearance of the text. The method comprises creating a synthesized font comprising a plurality of characters using characters present in a scanned document; replacing the plurality of characters in the scanned document with characters from the plurality of characters from the synthesized font; and enabling editing of the scanned document wherein enabling editing comprises adding at least some characters from the plurality of characters of the synthesized font to the document for at least some characters added during editing.

20 Claims, 4 Drawing Sheets rm you that I Saroj Kakkar holding pass
et my daughter & son-in law Mrs. & Mr. /—— 402
Tanner Road, North Point, Hong Kong.
April 2013 as a tourist. All the expenses you that I Saroj Kakkar holding pass
my daughter & son-in law Mrs. & Mr. /
anner Road, North Point, Hong Kong. —— 404
oril 2013 as a tourist. All the expenses

408 you that I Saroj|Kakkar holding passp
y daughter-in-law & son Mrs. & Mr. A
nner Road, North Point, Hong Kong. (—— 406
ril 2013 as a tourist. All the expenses

412 you that I Saroj Kakkar holding passp
y daughter|Mrs. Jhaanvi R/O Flat F,
Point, Hong Kong. Contact no. +852-—— 410
st. All the expenses will be borne by

FIG. 4

METHOD AND APPARATUS FOR ENABLING TEXT EDITING IN A SCANNED DOCUMENT WHILE MAINTAINING FIDELITY OF THE APPEARANCE OF THE TEXT

CROSS-REFERENCE TO RELATED APPLICATIONS

The present application hereby references and incorporates by reference U.S. Ser. No. 11/355,758, titled "Method and Apparatus for Creating a High-Fidelity Glyph Prototype from Low-Resolution Glyph Images", filed on Feb. 16, 2006.

BACKGROUND OF THE INVENTION

Field of the Invention

Embodiments of the present invention generally relate to text editing and, more particularly, to techniques for enabling text editing in a scanned document while maintaining fidelity of appearance of the text.

Description of the Related Art

An editable document includes typeface information (e.g., font-family, font-size and the like) for the typeface included in the document. As such, when the document is edited, the same typeface can be used, so that the appearance of the added text exactly matches that of the rest of the document. However, a scanned document is merely an image, sometimes referred to as a "flat document". Consequently, no typeface information is included with the scanned document image. As such, when an application enables text editing of the scanned document, a default font is used to add or edit text in the image of the scanned document. Additionally, the default font is used without regard to the layout of the text (i.e., paragraphs, headings, and the like). As a result, the fidelity of the document's appearance is lost, thereby providing a poor user experience. Therefore, there is a need for a method and apparatus for enabling text editing in a scanned document while maintaining fidelity of appearance of the text.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for enabling text editing in a scanned document while maintaining fidelity of appearance of the text is described. The method creates a synthesized font comprising characters from a scanned document. The characters of the scanned document are replaced by characters in the synthesized font. When the document is edited, characters that are found in the synthesized font are added from the synthesized font. When a character is added that is not found in the synthesized font, a similar-looking character is created and added to the document. The created similar-looking character is also added to the synthesized font.

In another embodiment, an apparatus for enabling text editing in a scanned document while maintaining fidelity of appearance of the text is described. The apparatus comprises a font generator for creating a synthesized font, and a document editing module for creating an editable document using the synthesized font, and for enabling editing of the editable document. When the document is edited, characters that are found in the synthesized font are added from the synthesized font. When a character is added that is not found in the synthesized font, a similar-looking character is created and added to the document. The created similar-looking character is also added to the synthesized font.

In yet another embodiment, a computer readable medium for enabling text editing in a scanned document while maintaining fidelity of appearance of the text is described. The computer readable medium stores computer instructions that, when executed by at least one processor causes the at least one processor to perform the method for enabling text editing in a scanned document while maintaining fidelity of appearance of the text.

BRIEF DESCRIPTION OF THE DRAWINGS

FIG. 4 illustrates an exemplary implementation of providing editable text into a scanned document configured in accordance with an embodiment of the present invention.

Figure 1:
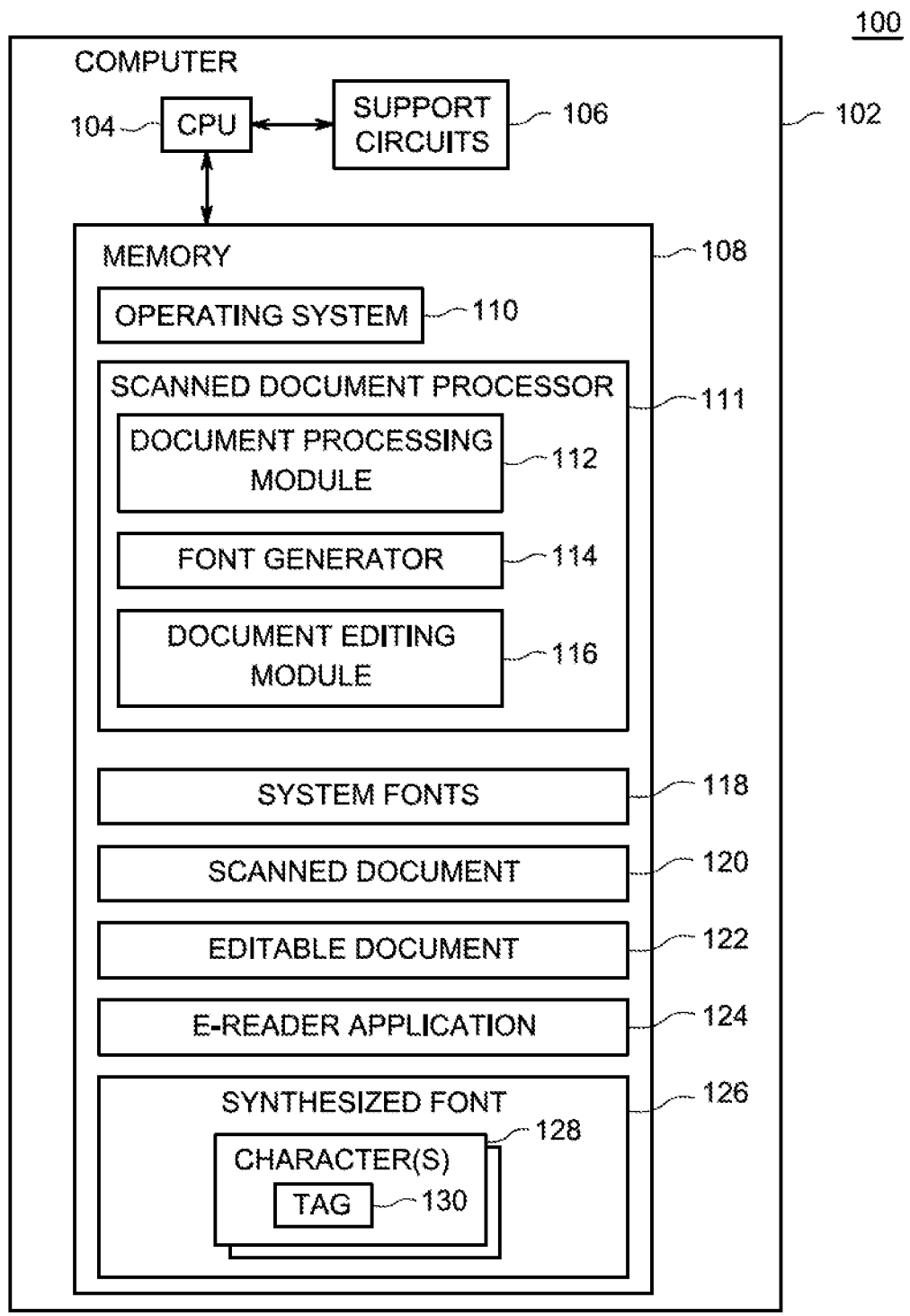
FIG. 1 is a block diagram of an apparatus for enabling text editing in a scanned document while maintaining fidelity of appearance of the text, according to one or more embodiments.

While the method and apparatus is described herein by way of example for several embodiments and illustrative drawings, those skilled in the art will recognize that the method and apparatus for enabling text editing in a scanned document while maintaining fidelity of appearance of the text is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for enabling text editing in a scanned document while maintaining fidelity of appearance of the text defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for enabling text editing in a scanned document while maintaining fidelity of appearance of the text. When a scanned document is opened in and displayed using document display software, for example, an e-reader software application, each character in the scanned document is extracted. A location of each character in the scanned document is also extracted. Each extracted character is compared to characters in fonts that already exist on a user's computer system, hereafter referred to as system fonts, in order to determine which system font most closely matches the font that was actually used to create said extracted character in the original document. A synthesized font, meaning a computer-generated font, is then created that includes a synthesized character collection corresponding to the collection of characters extracted from the scanned document. The characters in the scanned document are replaced by their corresponding characters from the collection of characters in the synthesized font. When the document is edited and new text characters are added to the document, the new text characters are taken from the collection of characters in the synthesized font. As such, faithfulness to the appearance of the original document is maintained. For example, if a word in the original scanned document was "ban" and the text was edited to be "banana", the added text, specifically, the characters "ana" appear identical to the "an" in the text "ban" because the appearance of each character is maintained in the synthesized font. However, if a new text character is added to the document that was not in the original scanned document, for example an "X" character, there is no corresponding character in the synthesized font. Using the system font that was found to most closely match the characters in the body of text (e.g., sentence, paragraph) where the new character is added, a raster image is taken of a character from the system font at a same dots per inch (DPI) as the characters of the scanned document. A vector outline is created for the new text character and the new text character is then added to the document. The new text character is also added to the character collection of the synthesized font.

As previously explained, existing solutions, while in edit mode, insert a system default text character that does not match the font or layout of the original document. These solutions fail to maintain fidelity of the appearance of the original document.

Thus, and in accordance with an embodiment of the present invention, techniques are provided herein that allow for editing text in a scanned document while maintaining the fidelity of the appearance of the document. Each character in a scanned document is extracted using optical character recognition (OCR). For each extracted character, OCR returns the character and bounding box information for the character. Bounding box information identifies a location of the character in the document.

Each character is compared to characters of the system fonts in order to determine which system font most closely matches the font that was actually used to create the character in the original document. For example, a "T" in a heading in the document may match a Times New Roman font, while an "a" in a paragraph of the document may match an Arial font. In order to determine a matching system font, a monochrome pixmap is extracted from each bounding box within the scanned document. A monochrome pixmap is character information in binary form that identifies points within the bounding box that are black and points within the bounding box that are white. The pixmaps for the characters are compared point by point to pixmaps created from characters in the system fonts. As a result of the comparison a closeness value is calculated for each character in the document. In some embodiments, a closest system font character is identified for each character in the document. In some embodiments, because each body of text (e.g., sentence, paragraph, page) is likely made up of characters with similar attributes, such as size, color, and the like, and therefore likely made up from a single font, a normalization is applied to each body of text. In such embodiments, the font that occurs most frequently in the body of text is assigned to each character in the body of text.

Similar characters that have a same identified system font are cleaned and merged in order to create a high fidelity character. The process of scanning the document causes a loss of resolution of the text, meaning the text may appear faded or blurry. Merging the similar characters improves the fidelity of each character.

A synthesized font is then generated that includes the cleaned extracted characters in the document. The synthesized font is created by creating vector outlines for each extracted character. The character collections of the synthesized font initially include all characters in the document. The appearance of the characters in the synthesized font is the similar to the appearance of the characters in the scanned document.

The extracted characters in the document are replaced by characters from the synthesized fonts. The synthesized font is embedded in the document to enable editing the document using the synthesized font.

In order to maintain fidelity of the appearance of the original document, when the document is edited and new text characters are added to the document, the added characters are taken from the character collection of the synthesized font. The result is that an added "a" character that, for example most closely matches an Arial 12 pt font looks identical to all of the other "a" characters in the document that most closely match the Arial 12 pt font because the added "a" character is the "a" character taken from the synthesized font. However, when it is desired to add a new text character to the document (that is, a character that was not in the original document, and therefore not in the synthesized font), a new character is created for inclusion in the document. A system font is identified that is the most closely matching system font to the neighboring characters of the newly added text character at a dots per inch (DPI) similar to that of the neighboring characters. For example, to edit the word "ban" to be band, where the character "d" is not included in the synthesized font, the neighboring characters where the d is being added are "n" and a space. The "n" was most closely matched to font Arial. A raster image is taken of the new character, in this example, the Arial "d" and a vector outline is created. The new character is added to the character collection of the synthesized font and also added to the document.

Advantageously, with the present invention, new text added to a scanned document closely matches the original scanned text. The present invention may be used as a plug-in or an added feature to an e-reader software application, such as ADOBE ACROBAT. Imperfections in newly added text match imperfections, if any, introduced into the original document when it was scanned. Thus, the present invention maintains the document appearance to such that it is difficult to determine if or where the document was edited, thus providing a powerful editing experience.

Various embodiments of a method and apparatus for enabling text editing in a scanned document while maintaining fidelity of appearance of the text are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for enabling text editing in a scanned document while maintaining fidelity of appearance of the text, according to one or more embodiments. The apparatus 100 includes a computer 102. The computer 102 is a computing device, for example a desktop computer, laptop, tablet computer, and the like. The computer 102 includes a Central Processing Unit (CPU) 104, support circuits 106, and a memory 108. The CPU 104 may include one or more commercially available microprocessors or microcontrollers that facilitate data processing and storage. The various support circuits 108 facilitate the operation of the CPU 104 and include one or more clock circuits, power supplies, cache, input/output circuits, and the like. The memory 106 includes at least one of Read Only Memory (ROM), Random Access Memory (RAM), disk drive storage, optical storage, removable storage and/or the like.

The memory 106 includes an operating system 110, a scanned document processor 111, one or more system fonts 118, a scanned document 120, an editable document 122, an e-reader application 124, and a synthesized font 126. The scanned document processor 111 includes a document processing module 112, a font generator 114, and a document editing module 116. The synthesized font 126 includes a collection of characters 128. Each character 128 includes a tag 130 that identifies the system font 118 that most closely matches the character 128. The operating system 110 may include various commercially known operating systems.

The e-reader application 124 may be any electronic reader, such as ACROBAT, capable of viewing and editing electronic documents.

When a scanned document 120 is opened and displayed using document display software, for example, using e-reader application 124, the document processing module 112 extracts each character in a scanned document 120 using optical character recognition (OCR). OCR converts an image to text, and the text in the image is identified. The scanned document 120 is merely an image with no typeface information to identify the type of font that was used to create the scanned document 120. As such, each character is actually an image and must be converted to text in order to make the scanned document 120 able to be edited. For each character, OCR returns the character and bounding box information for the character that identifies a location of the character in the scanned document 120.

The document processing module 112 compares each character returned by the OCR to characters in system fonts 118 which are fonts that are already installed on computer 102. The document processing module 112 finds a system font 118 that most closely matches each character in the scanned document 118 in order to determine which system font was actually used to create the character in the original document. For example, the scanned document 120 as originally created may include a heading in the font Times New Roman, in bold, with font-size of 16 pt. The scanned document 120 may also include characters in one or more paragraphs in the font Calibri, with font size of 12 pt. The paragraphs may also include characters in the font Calibri italics, with font size of 12 pt. Thus, the document processing module 112 looks for a closest matching system font 118 for each character in the scanned document 120.

The document processing module 112 extracts a monochrome pixmap from within each bounding box. A monochrome pixmap is character information in binary form (i.e., using 0s and 1s) that identifies where, within the bounding box is black and where within the bounding box is white. The document processing module 112 also extracts monochrome pixmaps for each character in the system fonts 118. The document processing module 112 compares the pixmaps for the characters in the scanned document 120 to pixmaps created from characters in systems fonts 118. A closeness value is calculated for each character in the scanned document 120. A closest system font 118 is identified for each character in the document based on the closeness value.

The document processing module 112 then cleans and merges similar characters. Characters in the scanned document 120 may not be of a high quality due to low resolution or other computer limitations. For example, a system font 118 may be designed for a laser printer that prints 600 dots per square inch (DPI). However, a character of a system font 118 may be displayed on a computer screen using 300 DPI. The lower DPI results in a lower resolution and therefore, low fidelity. In order to create a high fidelity character, the document processing module 112 merges similar characters that match a same identified system font 118. For example, the document processing module 112 may find two or more "a" characters that most closely match the system font 118 Calibri, 12 pt. The document processing module 112 merges and upscales the "a" characters, to create the higher fidelity character.

The font generator 114 creates a synthesized font 126 from the clean characters. The font generator 114 creates vector outlines for each of the cleaned characters from the scanned document 120. Each character 128 created in the synthesized font 126 has a tag 130 that identifies what system font 118 most closely matches the character 128. The synthesized font 126 is an embeddable character identifier-keyed (CID-keyed) font. A CID-keyed font is a font that identifies the shape of a character. There is no font associated with a CID-keyed font.

The document editing module 116 replaces the extracted characters in the scanned document 120 with characters from the synthesized font 126. This replacement creates editable document 122. The document editing module 116 also embeds the synthesized font 126 in the editable document 122 so that the document is capable using the synthesized font 126 when the editable document 122 is edited.

In order to maintain fidelity of appearance, when the document is edited and new text is added to the document, the document editing module 116 uses characters from the synthesized font 126 to represent the added characters. For example, suppose the scanned document 120 includes the character "a", but does not include the character "X". When an "a" character is added to the document, the tag 130 of the character 128 immediately before the added "a" character is accessed to identify the most closely matched system font 118 for the neighboring characters. The "a" character 128 that matches other "a" characters in the document 122 that have the same most closely identified system font 118 is added from the synthesized font 126. The result is that an added "a" character looks similar to all of the other "a" characters of the same matched system font 118 in the editable document 122.

However, should a new text character be added to the editable document 122 that was not in the original scanned document 120, there is no mapped character in the synthesized font 126. For example, an "X" character may be added to the editable document 122. The document editing module 116 calls the document processing module 112 to create the "X" character from a system font 118 with a similar looking appearance to the neighboring characters of the added "X". The document processing module 112 creates a raster image of the "X" from the system font 118 at a similar DPI as that of the editable document 122 and creates a new character "X" by creating a vector outline for the character. The document processing module 112 then adds the new character 128 to the synthesized font 126 with a tag 130 that identifies the system font 118. The document editing module 116 may then add the new character, in this example, character "X" to the editable document 122.

Figure 2:
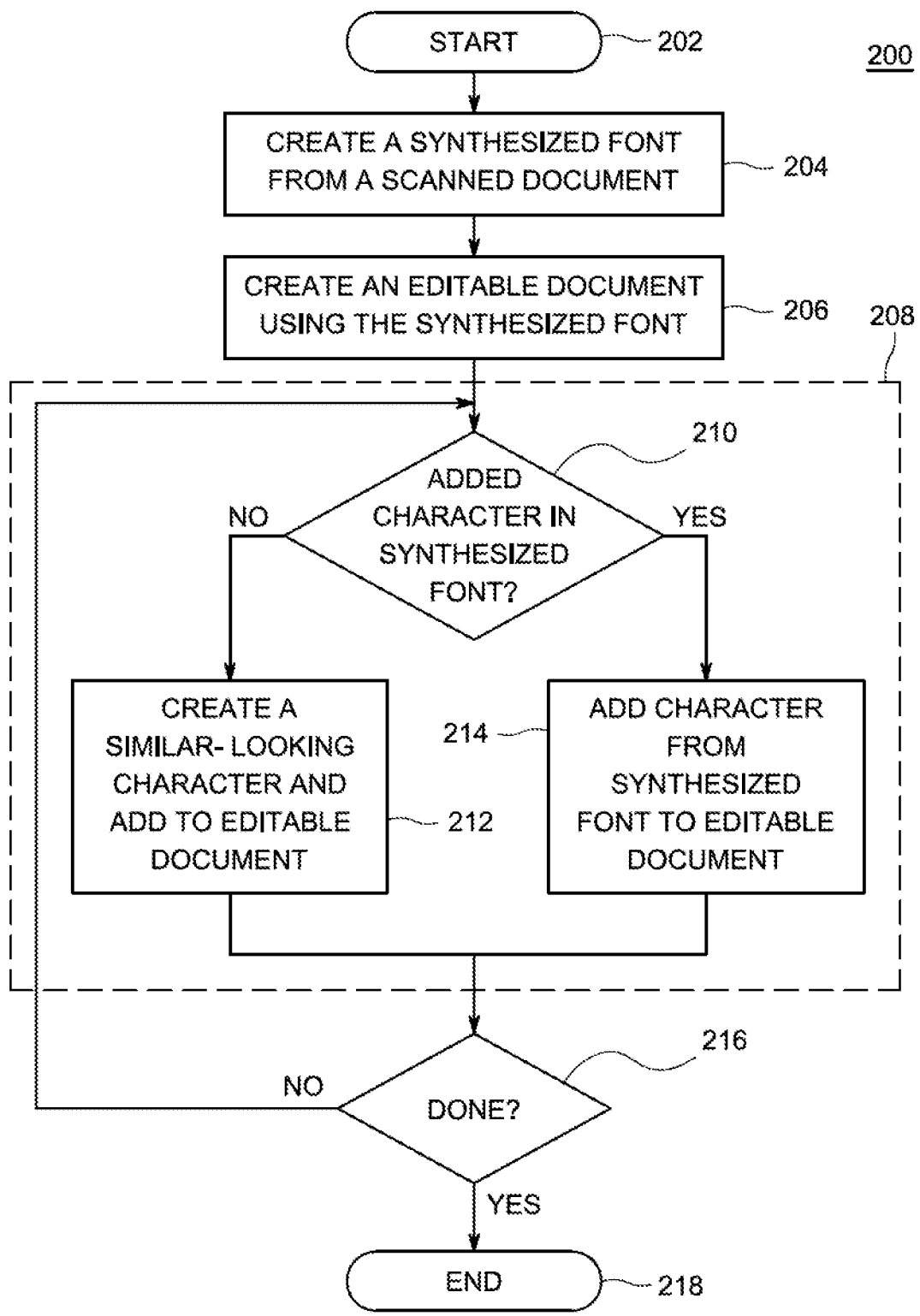
FIG. 2 depicts a flow diagram of a method for enabling text editing in a scanned document while maintaining fidelity of appearance of the text as performed by the scanned document processor of FIG. 1, according to one or more embodiments.

FIG. 2 depicts a flow diagram of a method 200 for editing text in a scanned document while maintaining the original appearance of the document as performed by the scanned document processor 111 of FIG. 1, according to one or more embodiments. The method 200 is invoked when a scanned document is opened in an e-reader application. The method 200 creates a synthesized font from characters extracted from the scanned document. The method 200 uses the synthesized font to create an editable version of the scanned document. The method 200 starts at step 202 and proceeds to step 204.

At step 204, the method 200 creates a synthesized font from a scanned document as described in further detail with respect to FIG. 3 below. The scanned document may be any document that includes text. The process of scanning a document creates imperfections in the text. As such, the characters of text in the document often appear less defined than they did before the document was scanned. Any additional text that is added during the editing of the document should appear similar to the text of the original scanned document such that the editing is imperceptible.

The method 200 proceeds to step 206, where the method 200 creates an editable document using the synthesized font created in step 204. The method 200 replaces each character in the scanned document with characters from the synthesized font. Because the document is no longer an image and instead includes characters from the synthesized font, the document may be edited.

The method 200 proceeds to step 208, where the method 200 enables editing of the now editable document, where each added character is processed as it is entered. When a character is added to the editable document, the method 200 proceeds to step 210.

At step 210, the method 200 determines whether the added character is included in the synthesized font. An added character is included in the synthesized font if the added character was already included in the scanned document. For example, if the scanned document includes text "The sun rises in the east and sets in the west" in a font that most closely matches a system font, for example, Arial 12 pt, the character collection of the synthesized font includes the characters "a, d, e, h, i, n, r, s, t, u, w, and T". A user may wish to add the text "The stars shine in the sky" in a region of the document. Each character is processed as it is entered. In the present example, the method 200 determines whether the character "T" is included in the synthesized font. The method 200 identifies the font identified in a tag of character in the synthesized font for the characters that immediately precede the added character "T". For example, if the most closely matching system font for the preceding character is Arial 12 pt, the method 200 identifies a character mapping to "T" for the Arial 12 pt. The method 200 proceeds to step 214.

At step 214, the method 200 adds the new character, in this example, the "T" character from the synthesized font to the document. When an added character is added from the synthesized font, the added character is similar in appearance to its preceding characters in the document because the characters in the synthesized font were created from the original characters. After the "T" is processed, the method 200 proceeds to step 216, where the method 200 determines whether editing is done. If the method 200 determines that editing is not complete, the method 200 proceeds to step 210 and iterates processing entered text until the user is done at which time the method 200 proceeds to step 218.

However, if at step 210, the method 200 determines that the added character is not included in the character collection of the synthesized font, the method 200 proceeds to step 212. In the present example, the method 200 continues to add the text characters of "The stars shine in the sky" from the synthesized text as described in step 214 until the character "k" is entered. When the character "k" is entered, the method 200 determines at step 210 that the added character is not in the character collection of the synthesized font and proceeds to step 212.

At step 212, the method 200 creates a similar-looking character to add to the editable document. The method 200 identifies a system font that matches the DPI of the original scanned document with similar attributes (e.g., size, color, etc.) as neighboring text. The method 200 then creates a raster image of the character from the identified system font. The raster image is created by rendering the identified system font at a font size of the document text. Rasterization is performed at the DPI of the scanned text of the original document. The method 200 then creates a new character, in the present example, "k" by creating a vector outline for the character. A vector outline is a combination of Bézeir curves. To create the vector outline, a transition map is created to distinguish points of the character by setting pixels from 0 to 1 or 1 to 0. These transitions points are used to generate inner boundary control points and outer boundary control points of the character pixel map. Two polygons are created from the boundary points. One polygon includes the inner boundary points and one polygon contains the outer boundary points. The combination of the polygons is a vector outline of the new character. The method 200 adds the new character to the synthesized font. The method 200 also adds the new character, in this example, the character "k" to the editable document. The method 200 proceeds to step 216, where the method 200 determines whether editing of the document is done. For example, if the user enters the "y" (from "sky"), the method 200 proceeds to step 210 and upon determining that the character "y" is not in the synthesized font, proceeds to step 212 and creates a "y" character to appear similar to the text in the editable document. When the method 200 determines that text editing is done, the method 200 proceeds to step 218 and ends.

Figure 3:
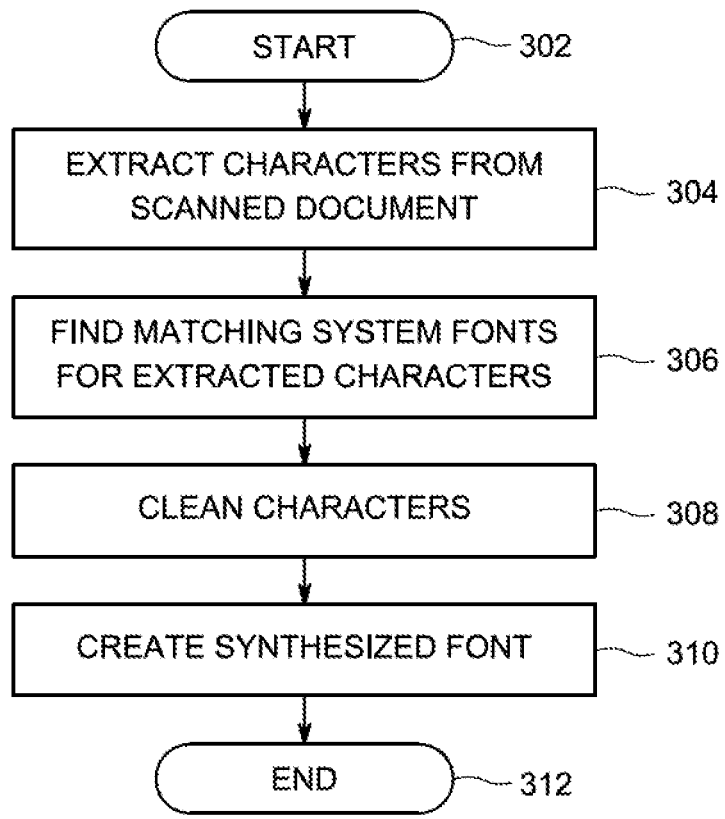
FIG. 3 depicts a flow diagram of a method for creating a synthesized font as performed by the document processing module and the font generator of FIG. 1, according to one or more embodiments.

FIG. 3 depicts a flow diagram of a method 300 for creating a synthesized font as performed by the document processing module 112 and the font generator 114 of FIG. 1, according to one or more embodiments. The method 300 extracts information about each character in the scanned document and creates a new font based on the extracted character information. The method 300 starts at step 302 and proceeds to step 304.

At step 304, the method 300 extracts each character in a scanned document using optical character recognition (OCR). For each character, OCR returns the character and bounding box information for the character that identifies a location of the character in the scanned document.

The method 300 proceeds to step 306, where the method 300 finds a system font that most closely matches each character in the scanned document in order to determine which system font was actually used to create the character in the original document. For example, the scanned document as originally created may include a heading in the font Times New Roman, in bold, with font-size of 16 pt. The scanned document may also include characters in one or more paragraphs in the font Calibri, with font size of 12 pt. The paragraphs may also include characters in the font Calibri italics, with font size of 12 pt. Thus, method 300 determines a closest matching system font for each character in the scanned document. The method 300 extracts a monochrome pixmap from within each bounding box. A monochrome pixmap is character information in binary form (i.e., using 0s and 1s) that identifies where, within the bounding box is black and where within the bounding box is white. The method 300 also extracts monochrome pixmaps for each character in the system fonts.

The method 300 compares the pixmaps for the characters in the scanned document to pixmaps created from characters in systems fonts. A closeness value is calculated for each character in the scanned document. Pixmap comparison is performed using any algorithm that performs distance matching between two pixmaps, such as JBIG2 algorithm. Generally, for pixmaps of two characters, for example, character A1 and character A2, the closeness value between the two characters is performed as follows. Attributes, such as height, width, blackness, perimeter, centroid and the like are analyzed to determine if the two characters are similar. If the attributes are similar, the centroids of the characters are overlapped and an XOR of their binary values is found. The XOR results in an identification of where binary values at a particular position in the two pixmaps are different. With these distinct position points, a difference value is calculated for the characters A1 and A2. A smaller value of the difference indicates a closer match. The method 300 identifies a closest matching system font for each character in the document based on the closeness value and stores this system font information as a tag with the character to be synthesized.

The method 300 proceeds to step 308, where the method 300 cleans and merges similar characters. Characters in the scanned document may not be of a high quality due to low resolution or other computer limitations. For example, a system font may be designed for a laser printer that prints 600 dots per square inch (DPI). However, a character of a system font may be displayed on a computer screen using 300 DPI. The lower DPI results in a lower resolution and therefore, low fidelity. The process of scanning the document may have lowered the resolution further. In order to create a high fidelity character, the method 300 merges similar characters that match a same identified system font. For example, the method 300 may find two or more "a" characters that most closely match the system font Calibri, 12 pt. The method 300 merges and upscales the "a" characters, to create the higher fidelity character. Details for how characters are merged and used to create high fidelity and high resolution characters is described in detail in U.S. patent Ser. No. 11/355,758 which is herein incorporated by reference in its entirety.

The method 300 proceeds to step 310, where the method 300 creates a synthesized font from the clean characters. The method 300 creates vector outlines for each of the cleaned characters from the scanned document as well as for each character in the identified one or more system fonts that are most closely matched to the characters in the scanned document. The synthesized font is an embeddable character identifier-keyed (CID-keyed) font. The synthesized font is a Compact Font Format font. The synthesized font includes various dictionaries to define the various properties of the font, a ToUnicode table, and vector outlines for all of the characters present in the font. The method 300 proceeds to step 312 and ends.

FIG. 4 illustrates an exemplary implementation of providing editable text from a scanned document configured in accordance with an embodiment of the present invention. The text 402 is a sample of text from a scanned document. The scanning process created imperfections in the characters of the text. The resolution of the text is low, giving a blurry appearance. The text 404 is a sample of text illustrating the characters of the scanned document after being replaced by the characters in the synthesized font. Due to the fact that the extracted characters from the scanned document are cleaned via merging and up-scaling before the synthesized font is created, the text 404 has a better resolution than the sample of text 402 from the scanned document.

The text 406 illustrates adding text to the sample text 404. The text in 404 was changed from daughter to daughter-in-law. The text "-in-law" was added. All characters in the text "-in-law" 408 are created by using characters in the synthesized font. As such, the added text 408 is identical to the other text 406. The text 410 illustrates adding text where there is no corresponding text in the synthesized font. The name Jhaanvi is text added to text 410. The characters "h", "a", "n", "v" and "i" are characters that all exist in the collection of characters of the synthesized font. However, the character "J" 412 is not yet included in the collection of characters of synthesized font. Accordingly, a raster image of a "J" is created that has the same size and DPI as the document and with similar attributes (size, color, and the like) as the neighboring text. A character from a system font is found that is the same size and appearance as the "J". A vector outline is created for the character "J", which is then added to the document and also added to the synthesized font.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
for each original character in a set of original characters present in a scanned document, determining a system font, from a plurality of system fonts, corresponding to the original character;
generating, by at least one processor, a synthesized digital font comprising a plurality of synthesized characters corresponding to the set of original characters present in the scanned document;
generating, by the at least one processor, an editable version of the scanned document by replacing the set of original characters in the scanned document with corresponding synthesized characters from the plurality of synthesized characters of the synthesized digital font; and
enabling editing of the scanned document wherein enabling editing comprises:
  detecting user input of a new character at a location in the scanned document;
  identifying a first system font corresponding to a neighboring character of the location of the new character, wherein the first system font is one of the plurality of system fonts and the neighboring character is one of the original characters from set of original characters;
  adding a synthesized character from the plurality of synthesized characters of the synthesized digital font to the editable version of the scanned document based on the new character, the first system font, and the location.

2. The method of claim 1, further comprising:
detecting user input of a second new character at a second location in the scanned document;
determining that the second new character is not among the synthesized characters of the synthesized digital font; and
based on the determination that the second new character is not among the synthesized characters of the synthesized digital font, creating a similar-looking character for the second new character.

3. The method of claim 2, further comprising adding the similar-looking character to the editable version of the scanned document at the second location.

4. The method of claim 3, wherein generating the synthesized digital font further comprises creating a vector outline for each original character in the set of original characters.

5. The method of claim 3, wherein generating the synthesized digital font further comprises optical character recognition processing of the scanned document so as to provide character information for each of the original characters of the set of original characters and bounding box information for each of the original characters of the set of original characters.

6. The method of claim 2, wherein creating the similar-looking character comprises:
identifying a second system font corresponding to a neighboring character of the second location of the second new character, wherein the second system font is one of the plurality of system fonts and the neighboring character of the second location is one of the original characters from the set of original characters;
creating a raster of the second new character from the second system font;
generating a vector outline for the second new character; and
adding the similar-looking character to the synthesized digital font.

7. The method of claim 1, wherein determining the system font for each original character in the set of original characters comprises, for each character in the set of original characters:
extracting a monochrome pixmap; and
determining the system font, from the plurality of system fonts, that most closely matches the extracted monochrome pixmap.

8. The method of claim 7, wherein generating the synthesized digital font further comprises merging similar monochrome pixmaps, from the extracted monochrome pixmaps, that are determined to most closely match a common system font.

9. The method of claim 8, wherein merging similar monochrome pixmaps comprises:
determining two or more monochrome pixmaps that are determined to be most closely matched to a same system font; and
combining and upscaling the two or more monochrome pixmaps.

10. The method of claim 7, wherein determining the system font for each original character in the set of original characters further comprises:
generating a pixmap for each character in each system font in the plurality of system fonts;
comparing the extracted monochrome pixmap for each original character to each pixmap for each character in each system font;
assigning a closeness value to each comparison; and
selecting a closest system font as a font used for each original character in the set of original characters based on the closeness value.

11. The method of claim 1, wherein the synthesized digital font is an embeddable CID-keyed font.

12. An apparatus for enabling text editing in scanned documents while maintaining fidelity of appearance of the text comprising:

a computer having one or more processors; and
a non-transitory storage medium comprising instructions, that when executed by the one or more processors, cause the computer to:
for each original character in a set of original characters present in a scanned document, determine a system font, from a plurality of system fonts, corresponding to the original character;
create a synthesized digital font comprising a plurality of synthesized characters corresponding to the set of original characters present in the scanned document;
create an editable document from the scanned document by replacing the set of original characters in the scanned document with corresponding synthesized characters from the plurality of synthesized characters of the synthesized digital font;
detect user input of a new character at a location in the scanned document;
identifying a first system font corresponding to a neighboring character of the location of the new character, wherein the first system font is one of the plurality of system fonts and the neighboring character is one of the original characters from set of original characters; and
add a synthesized character from the plurality of synthesized characters of the synthesized digital font to the editable document based on the new character, the first system font, and the location.

13. The apparatus of claim 12, further comprising instructions that, when executed by the one or more processors, cause the computer to create the synthesized digital font by:
extracting the original set of characters from the scanned document;
extracting a monochrome pixmap for each extracted original character;
merging similar monochrome pixmaps that are determined to most close match a same system font; and
creating a vector outline for each character in the set of original characters.

14. The apparatus of claim 13, further comprising instructions, that when executed by the one or more processors, cause the computer to determine the system font for each original character in the set of original characters by:
generating a pixmap for each character in each system font in the plurality of system fonts;
comparing the extracted monochrome pixmap for each original character to each pixmap for each character in each system font;
assigning a closeness value to each comparison; and
selecting a closest system font as a font used for each original character in the set of original characters based on the closeness value.

15. The apparatus of claim 13, further comprising instructions that, when executed by the one or more processors, cause the computer to merge similar monochrome pixmaps by:
determining two or more monochrome pixmaps that are determined to be most closely matched to a same system font; and
combining and upscaling the two or more monochrome pixmaps.

16. The apparatus of claim 12, wherein the synthesized digital font is an embeddable CID-keyed font, and further comprising instructions that, when executed by the one or more processors, cause the computer to:
detect user input of a second new character at a second location in the scanned document;

based on a determination that the second new character is not among the synthesized characters of the synthesized digital font:
  identify a second system font corresponding to a neighboring character of the second location of the second new character, wherein the second system font is one of the plurality of system fonts and the neighboring character of the second location is one of the original characters from the set of original characters; and
  create a similar-looking character for the second new character based on the second system font; and
add the similar-looking character to the synthesized digital font.

17. A non-transitory computer readable medium for storing computer instructions that, when executed by at least one processor causes the at least one processor to perform steps of enabling text editing in scanned documents while maintaining fidelity of appearance of the text comprising:
for each original character in a set of original characters present in a scanned document, determining a system font, from a plurality of system fonts, corresponding to the original character;
creating a synthesized digital font comprising a plurality of synthesized characters corresponding to the set of original characters present in the scanned document;
creating an editable document from the scanned document by replacing the set of original characters in the scanned document with corresponding synthesized characters from the plurality of synthesized characters of the synthesized digital font;
detecting user input of a new character at a location in the scanned document;
identifying a first system font corresponding to a neighboring character of the location of the new character, wherein the first system font is one of the plurality of system fonts and the neighboring character is one of the original characters from set of original characters; and
adding a synthesized character from the plurality of synthesized characters of the synthesized digital font to the editable document based on the new character, the first system font, and the location.

18. The computer readable medium of claim 17, wherein creating the synthesized digital font comprises:

extracting the set of original characters from the scanned document;
extracting a monochrome pixmap for each extracted character;
merging similar monochrome pixmaps that are determined to most close match a same system font; and
creating a vector outline for each character in the scanned document.

19. The computer readable medium of claim 18, wherein determining a system font comprises:
generating a pixmap for each character in each system font in the plurality of system fonts;
comparing the extracted monochrome pixmap for each original character to each pixmap for each character in each system font;
assigning a closeness value to each comparison; and
selecting a closest system font as a font used for each character in the scanned document based on the closeness value.

20. The computer readable medium of claim 17, further comprising instructions that, when executed by the at least one processor cause the at least one processor to perform the following steps:
detecting user input of a second new character at a second location in the scanned document;
based on a determination that the second new character is not among the synthesized characters of the synthesized digital font:
  identifying a second system font corresponding to a neighboring character of the second location of the second new character, wherein the second system font is one of the plurality of system fonts and the neighboring character of the second location is one of the original characters from the set of original characters;
  creating a similar-looking character for the second new character by creating a raster of the second character from the second system font, and generating a vector outline for the second new character; and
adding the similar-looking character to the synthesized digital font.

* * * * *